(12) United States Patent
Geer

(10) Patent No.: US 7,451,728 B1
(45) Date of Patent: Nov. 18, 2008

(54) ELECTRONIC CONTROLLED SYSTEM FOR ENGINES

(76) Inventor: Justin M. Geer, 439 Harcourt Ave., San Antonio, TX (US) 78223

(*) Notice: Subject to any disclaimer, the term of this patent is extended or adjusted under 35 U.S.C. 154(b) by 0 days.

(21) Appl. No.: 11/656,589

(22) Filed: Jan. 22, 2007

Related U.S. Application Data

(63) Continuation-in-part of application No. 10/879,307, filed on Jun. 28, 2004, now abandoned.

(51) Int. Cl.
*F01L 9/04* (2006.01)

(52) U.S. Cl. ............. 123/90.11; 123/90.15; 251/129.01

(58) Field of Classification Search ............. 123/90.11, 123/90.15, 90.17, 90.16, 90.27, 90.31; 251/129.01, 251/129.15, 129.16
See application file for complete search history.

(56) References Cited

U.S. PATENT DOCUMENTS

| | | | |
|---|---|---|---|
| 6,085,706 A | 7/2000 | Kadowaki et al. | |
| 6,240,359 B1 | 5/2001 | Fujiwara et al. | |
| 6,747,448 B2 | 6/2004 | Berndt | |
| 2001/0042528 A1 | 11/2001 | Takahashi | |
| 2002/0174841 A1 | 11/2002 | Ashida | |
| 2003/0041823 A1 | 3/2003 | Takemura et al. | |

*Primary Examiner*—Ching Chang
(74) *Attorney, Agent, or Firm*—Harpman & Harpman

(57) ABSTRACT

A rotatable media storage disk creates a simulation of the rotational motion of a cam shaft which would typically provide signals to the vehicle's computer for cam shaft position and necessary requirement for valve operation. A sensor controller has been provided to work independently or in combination with an engine computer to achieve direct control of the engine valves by providing multiple data channels capable of information input, storage and output by corresponding multiple read write sensors being timed directly to the crank shaft to control a wide range of automotive engine applications.

7 Claims, 3 Drawing Sheets

ELECTRONIC CONTROLLED SYSTEM FOR ENGINES

This is a continuation in part patent application of Ser. No. 10/879,307, filed Jun. 28, 2004 now abandoned.

BACKGROUND OF THE INVENTION

1. Technical Field

This invention relates to internal combustion engines, more particularly, the present invention relates to valve timing in internal combustion engines using electronically controlled systems without the use of a timing cam.

BACKGROUND

Currently, engines are using the engine computer and crank shaft position sensor to time the electronic valves without the use of a conventional cam shaft. Since such engine computers have no cam shaft to detect, the engine computer must decode two crank shaft rotations for the four stroke cycle, to produce the timing interval in which to time the electronic valves. The engine computer must now generate all of the valve timing signals based off of one crank shaft position sensor in two rotations. This amplifies software errors and increases chances of failure and raises processing power and cost effectively.

Current mechanically valve operated engine computers are being employed to receive signals from a mark on the crank shaft indicating the crank shaft position. This crank shaft signal also provides timing information regarding the ignition and fuel requirements. The same crank shaft detection systems are being used on those mechanically controlled valve engines and are being used on electronically controlled valve so-called camless engines by producing an algorithm within the engine computer which is then employed to simulate the position of each of the piston positions and to product the correct valve motion, but these algorithm programs are only based on the crank shaft position sensor which only detects rotation for every 360 degrees. By using the crank position detection system, the valve timing can be adjusted as desired, but is considered to be a compromise due to its limited signal value. The valves are opened and closed by solenoids actuated by signals from the computer, this operation requires tremendous computation power greatly increasing the cost to achieve electronically controlled valve timing.

2. Description of Prior Art

Prior art devices of this type have relied on a variety of different designs, see U.S. Pat. Nos. 6,260,524, 6,240,359, 6,085,706, 6,000,375, 5,499,606, 6,397,799, 5,548,051 and 6,747,448. Also see Patent Publication 2001/0042528 A1, 2003/0041823 and 2002/0174841.

SUMMARY OF THE INVENTION

An electronic disk sensor information storage and control device for internal combustion engines that utilizes multiple data channels to achieve direct control of the engine valves, independently of engine computer. The device sensor is timed directly to the crank shaft of the engine with multiple read and write data sensor heads for retrieval and storage of controlled data information providing unparalleled control and activation of a number of engine components for valve timing, fuel injection and other engine control criteria.

DETAILED DESCRIPTION OF THE INVENTION

Figure 1:
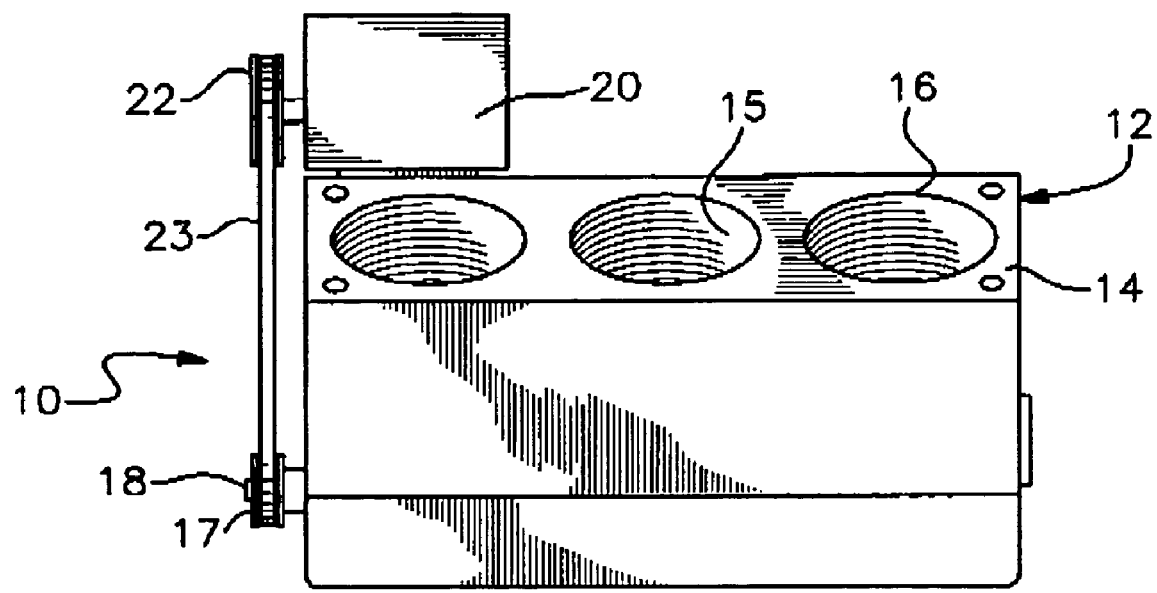
FIG. 1 is a simplified schematic diagram of an internal combustion engine from the side according to the present invention.
Figure 2:
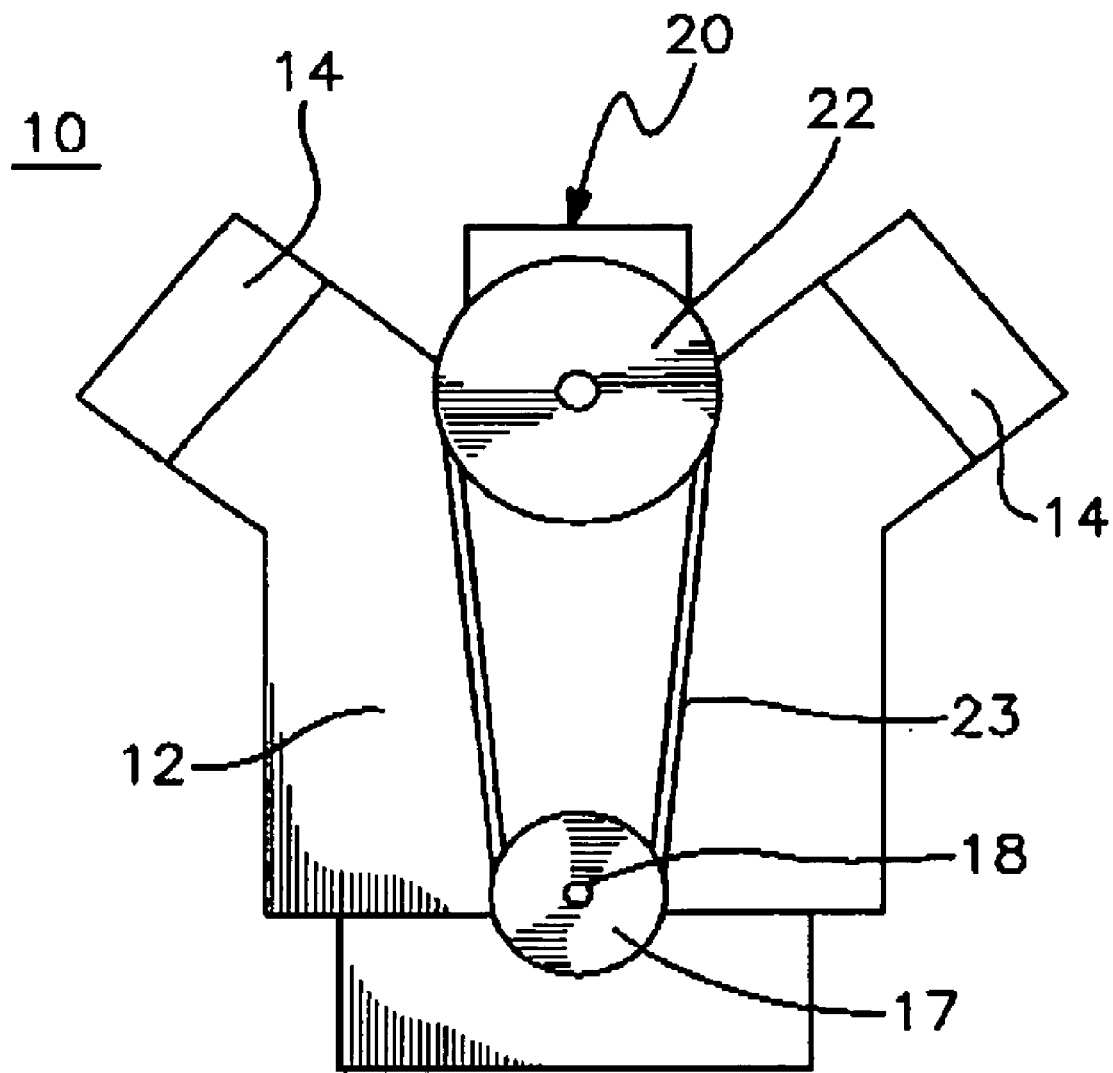
FIG. 2 is a simplified schematic diagram of an internal combustion engine from the end according to the present invention.

Turning now to the drawings in which like reference characters indicate corresponding elements throughout the several views, attention is first directed to FIGS. 1 and 2 which are simplified diagrams illustrating an internal combustion engine generally designated 10. Engine 10 includes an engine block 12 and cylinder head 14. Cylinder head 14 houses the engine valves. Pistons 16 in cylinders 15 reciprocate in linear strokes powered by the internal combustion of fuel in the cylinders 15. The linear strokes of pistons 16 are converted into rotary motion by a crank shaft 18. A crank pulley 17 is coupled to crank shaft 18 and rotates therewith. A disk controller unit 20 of the invention is mounted on engine block 12, or in the vicinity, and includes a controller pulley 22 coupled to crank pulley 17 by a belt 23 chain, gears or other similar devices. The ratio for a 4-stroke engine is 2:1, with crank pulley 17 making two full rotations for every rotation of controller pulley 22. It will be understood that other ratios can be used if desired.

Figure 3:
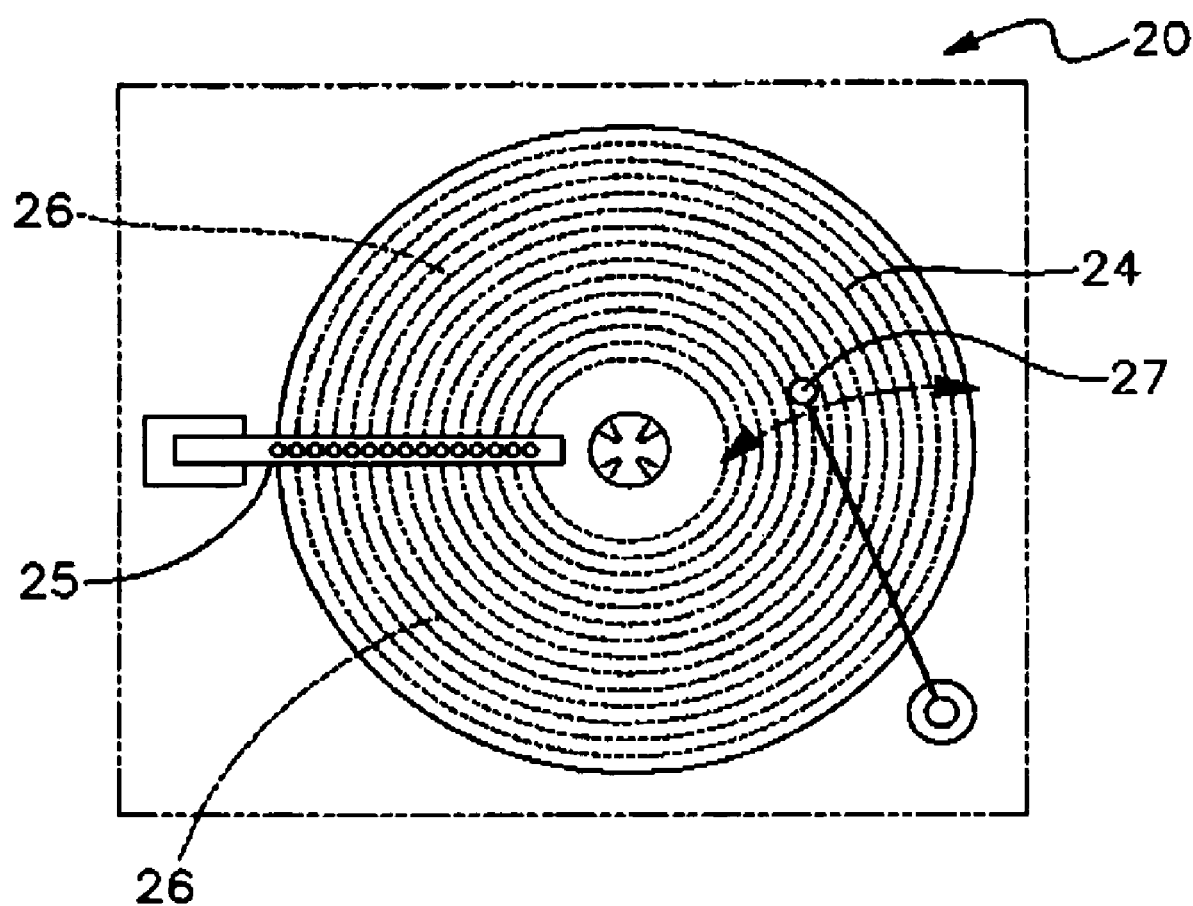
FIG. 3 is a graphic front view of the disk controller of the invention.

Referring to FIG. 3 of the drawings, the disk controller 20 of the invention is illustrated for graphic functionality to the benefit of the explanation of the invention.

A magnetic data encodable disk 24 having an area of fixed magnetic reading and writing data sensor heads 25. Each of the data sensor heads 25 are fixed in alignment with their own specific and individual electronic data management magnetic data track 26. The data tracks 26 each can be encoded to control different engine parameters such as to a specific valve which operates at a specific set of degrees in the engine 10. It will be evident from the above description that due to the small size of the scanning data sensor heads 25, the number of heads and associated data tracks 26 can be numerous. An example would be in a thirty-two valve engine (not shown), it would require a control system for each valve, thus sixty-four signals and accordingly in this example sixty-four data control tracks and sensor heads to control the timing of the engine.

Other engine control aspects such as fuel injection, spark ignition as well as data storage for engine diagnostic functions can be stored and retrieved as well given the capacity of the multiple tracks.

The fixed data sensor heads 25 are mainly used for reading "a data control loop" of each data track 26 for the hereinbefore engine function valve timing and ignition timing wherein the "control loop" provides the high resolution, precise and robust timing control required. The data disk 24, as noted, is recordable with new informational data and this imparts programmable control functionality to the system unavailable in prior art devices.

A mobile data sensor head 27 such as is found commercially and is available in computer hard drive applications allows in this instance for any of the sensor data tracks 26 of the invention to be accessed and to be written with data thereto. In some applications using the disk sensor hardware for the valve control may also use a valve position feedback sensor system to ensure the valve is achieving the lift result desired and respond like other engine valves in the system. This eliminates mechanical deficiencies in a valve because of a fixed signal that does not adjust for wear. The pre-rate feature carried out by the mobile sensor data head 27 allows the engine valves to gradually change their power requirements/profiles as the valve wears as will be evident and understood by those skilled in the art. Thus the mobile sensor head 27 efficiently can change the hardware to be read by the fixed data sensor heads 25 so that it doesn't miss the next engine cycle. This is done gradually unless a different result is desired. If in a camless engine design without a feedback loop you would have to independently measure the lift and performance of each engine valve (not shown) and tune accordingly to ensure uniformity, but this may not adjust or account for wear, but may be suitable for some applications. The disk control sensor system 20 of the invention can be programmed through the use of software to either automatically update the profile using the feedback loop at a cost or tune the engine valves manually to reduce software. The control sensor system 20 has the ability and intention to independently store the engine valve profiles as condition changes which will lead to longer engine valve life expectancy. Additionally, it should be noted that certain applications one or more of the data sensor heads 27 pre-writing data before the fixed data sensor heads 25 is more economical than switching between data tracks 26 with one function in mind, this design allows the data track 26 to be edited and re-programmed prior to the data track being read by the fixed data sensor heads 25 therefore achieving a new desired output. It is important for keeping the electromagnetic valves or similar valves functioning uniformly because the valves wear as they operate. That wear effects the output of the valve using a particular signal. For example, valve wear may result in decreased valve lift, but only in one cylinder of the engine 10 thus effecting air fuel ratio performance. Since the electromagnetic valve as referred to herein and above is mechanical and might not be adjustable the signal that now goes to the valve must be increased or compensated accordingly for mechanical efficiency. This type of data storage system of the invention is compatible with storage requirements of modern vehicle engine computers (not shown), such as navigation entertainment systems as will be evident and understood by those skilled in the art. It will be evident to those skilled in the art additionally that other data detection and encoding systems could be used such as layered based read and write systems (not shown) in which a layered based detection and decoding as well as rewriteable removal of larger data transfers can be used.

It will thus be seen that a disk sensor based engine management and control system has been illustrated and described and that such systems provide a high quality and level of control related to engine crank shaft position as it is associated to all of the engine's timing functions in addition to modern vehicle data storage and retrieval. This control is achieved through the large number of independent control data signals which are derived from multiple fixed data sensor heads 25 and because the head 25 size allows for a large quantity in small spaces this sensor has the ability to provide engine computer with more inputs and thus control, resulting in increased horsepower, reduced emissions and increased torque. With large numbers of fixed data sensor heads 25 positioned over the data tracks 26 on the magnetic disk 24 and the mobile data sensor head 27 to prescribe events to the fixed data sensor heads 25, the system has hardware to support the most demanding software applications. A camless engine requires a large amount of data to run especially when not requiring an engine computer. Therefore a new and useful sensor should be used to support such systems with data storage, timing and control that this disk control 20 of the invention possesses.

The disk controller 20 of the invention may also utilize more than one disk such as multi-platter hard drives because this application subjects the disk to harsh environments the reduction of disk size can remove and help alleviate the disk from vibration. If the disk is now smaller to avoid this vibration then it is only practical to add more data storage space through the use of additional disks.

It will thus be seen that a new and novel electronic engine controller has been illustrated and described and it will be apparent to those skilled in the art that various changes and modifications may be made thereto without departing from the spirit of the invention.

Therefore, I claim:

1. An electronic engine timing device for use on camless internal combustion engines to variable adjust electronically controlled valve timing in relation to a crank shaft position comprises,
    a disk sensor controller timed to an engine crank shaft, an information disk containing readable media tracks rotatable by said engine crank shaft,
    multiple magnetic sensors heads reading said readable media tracks and communicating control signals to engine components and an engine computer,
    said readable media tracks in radially spaced relation to one another defining independent annular paths on said information disk,
    said control signals from said disk sensor controller including ignition timing, fuel timing and valve operation for direct control thereof,
    means for engine operation in direct communication from said disk sensor controller to said engine computer,
    means for rewriting said readable media tracks in accordance with progressive engine component wear to compensate for same.

2. The electronic engine timing device set forth in claim 1 wherein said means for rewriting said readable media tracks comprises an independent movable magnetic sensor head.

3. The electronic engine control device set forth in claim 1 wherein said readable media tracks are of sensing detection material including magnetic and topographical surface treatments.

4. The electronic timing device set forth in claim 1 wherein said disk sensor controller generating control signals to said engine components of said camless engine for operation based on rotational position of said disk readable media tracks on said information disk in relation to engine parameters.

5. An electronic engine timing device for use on camless internal combustion engines having a crank shaft to variably adjust and electronically control engine valve timing in relation to crank shaft position comprises, a disk sensor controller in communication with said engine crank shaft using a rotation ratio of 2 to 1 wherein said crank shaft rotates twice to every one turn of the disk sensor controller having an information disk,
    electronic readable media in said disk sensor controller for detecting an engine valve timing position at any point during its rotation communicating control signals to an engine computer, multiple magnet track sensors on said electronic readable media, said control signals including ignition timing, fuel timing and engine valve operation, means for said control signals sent directly to said engine valves or other engine components such as a fuel injector for direct operation thereof, said electronic readable media comprising annular media tracks having encoded electronic engine operational profile information thereon and means for rewriting said annular media tracks.

6. The electronic timing device set forth in claim 5 wherein one of said multiple magnetic track sensors is movable between said annular media tracks.

7. The electronic timing device set forth in claim 6 wherein one of said multiple magnetic track sensor is movable rewrites selective annular media tracks.

* * * * *